3,817,790
SEALED PRIMARY SODIUM IODINE BATTERY
Stephan P. Mitoff, Elnora, N.Y., assignor to
General Electric Company
Filed June 18, 1971, Ser. No. 154,400
Int. Cl. H01m 13/00, 23/02
U.S. Cl. 136—83                  4 Claims

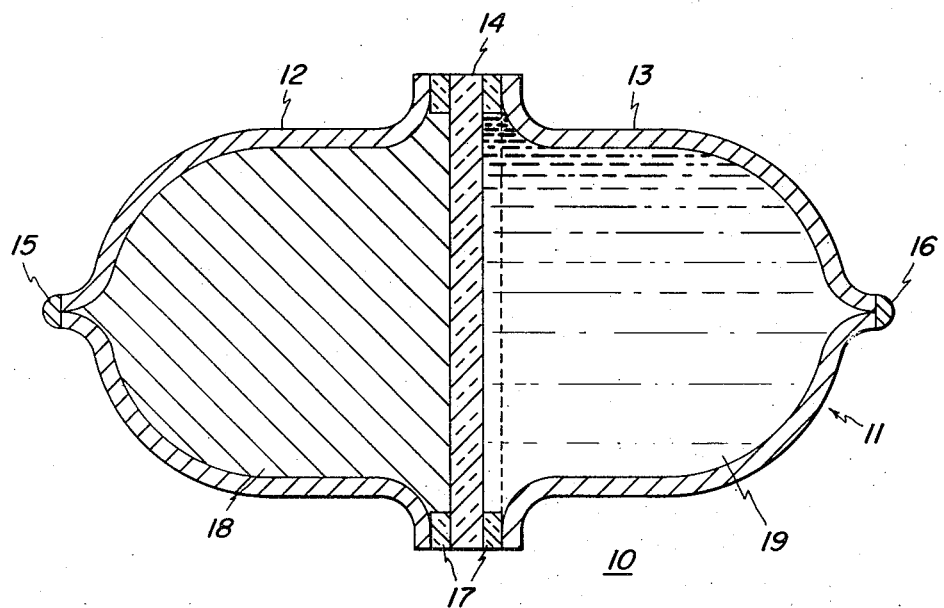

ABSTRACT OF THE DISCLOSURE

A sealed primary sodium-iodine battery is disclosed which comprises a casing, a solid sodium anode positioned in the casing, a solid sodium ion-conductive electrolyte adjacent the anode, and a cathode positioned adjacent the opposite side of the electrolyte, the cathode consisting of solid iodine and iodine contained in a solution of alcohol and sodium iodide.

---

This invention relates to sealed primary batteries and, more particularly, to such batteries employing a solid sodium anode and a cathode of solid iodine and iodine in a specific solution.

Sodium-sulfur cells, which operate at elevated temperatures, are known in the prior art as, for example, described in Kummer et al. Pat. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina. Such cells are operated at temperatures above 300° C.

In copending patent application Ser. No. 154,550, filed June 18, 1971, entitled "Sealed Sodium-Iodine Battery" in the names of Richard J. Charles and Stephan P. Mitoff, there is described and claimed a battery employing a solid sodium anode and a solid iodine cathode. This copending application is assigned to the same assignee as the present application.

My present invention is directed to providing a sealed primary sodium-iodine battery operable in a temperature range of $-98°$ C. to 64° C. as opposed to the above sodium-sulfur cells and at a higher open circuit voltage than the above reference copending application.

The primary object of my invention is to provide a battery which has a zero self-discharge rate, high cell voltage and high energy density.

In accordance with one aspect of my invention, a sealed primary sodium-iodine battery comprises a casing, a solid sodium anode positioned in the casing, a solid sodium ion-conductive electrolyte adjacent the anode, and a cathode positioned adjacent the opposite side of the electrolyte, the cathode consisting of solid iodine and iodine contained in a solution of alcohol and sodium iodide.

These and various other objects, features and advantages of the invention will be better understood from the following description taken in connection with the accompanying drawing in which:

The single figure is a sectional view of a battery made in accordance with my invention.

In the single figure of the drawing, there is shown generally at 10 a sealed primary sodium-iodine battery embodying my invention which has a metallic casing 11 including an anode portion 12 and a cathode portion 13 defined by a solid sodium ion-conductive electrolyte 14 positioned within casing 11. An electrical lead (not shown) is affixed to the respective casing portions. Closed fill tubes 15 and 16 are associated with the respective portions 12 and 13. Electrolyte 14 is secured on opposite sides to portions 12 and 13 by identical glass seals 17. Solid sodium 18 fills the anode casing portion 12 while iodine 19 in a solution of alcohol and sodium iodine fills the cathode casing portion 13. The battery operates in a temperature range of $-98°$ C. to 64° C.

I found that I could form a sealed primary sodium-iodine battery by providing a metallic casing with an anode portion and a cathode portion, providing a solid sodium ion-conductive electrolyte, joining both portions thereto by glass seals, providing solid sodium in the anode portion, and providing solid iodine and iodine in a solution of alcohol and sodium iodide in the cathode portion. I found that such batteries have an open circuit voltage of 3.2 volts.

The anode casing portion should preferably be nickel or Kovar alloy while the cathode casing portion should preferably be niobium or tantalum. These metals have been shown to be chemically stable in their respective environments.

The operable temperature range of $-98°$ C. to 64° C. for the anode and cathode and the higher open circuit voltage are attained by employing the respective anode and cathode materials of sodium and solid iodine and iodine in solution. Suitable solutions for the iodine components include various types of alcohol and sodium iodide. Of the various alcohols, we prefer methanol.

A unique method of hermetically sealing the anode and cathode portions of the casing to opposite sides of the solid electrolyte is disclosed and claimed in copending patent application entitled "Method of Forming a Metallic Battery Casing" in the name of Stephan P. Mitoff filed June 1, 1971, as Ser. No. 148,793. This copending application is assigned to the same assignee as the present application. I prefer this method wherein a disc of solid sodium ion-conductive electrolyte, for example, sodium beta-alumina, has stacked thereon a ring of General Electric Company 1013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1000° C. for about one minute. The resulting seal is helium leak-tight. The process is repeated to seal the cathode portion to the opposite surface of the solid electrolyte. Both anode and cathode portions can also be sealed simultaneously to the disc in the above manner.

I found the anode portion can be filled with sodium through tube 15 after which the tube is sealed, as for example, by welding. The cathode portion is filled with solid iodine powder and iodine in its solution of alcohol and sodium iodide through tube 16, after which the tube is similarly sealed. The resulting device is a sealed sodium-iodine battery operable in the temperature range of $-98°$ C. to 64° C. This wide temperature range is suitable to provide for most ambient operating temperatures. Leads (not shown) are attached to the respective casing portions for operation of the battery. The battery can be employed as a primary battery.

Examples of sealed sodium-iodine batteries made in accordance with my invention are set forth below:

EXAMPLE I

A battery was assembled consisting of a beta-alumina tube which was sealed on one end to a glass tube and closed on the opposite end. The tube was filled with solid sodium and a fernico alloy lead was in contact with the solid sodium and hermetically sealed into the glass tube. The sodium containing beta-alumina tube was immersed in a glass beaker containing solid iodine powder and iodine in a solution of methanol and sodium iodide. A platinum lead was immersed in the beaker and formed the positive pole of the sodium-iodine battery.

EXAMPLE II

The battery of Example I showed an open circuit voltage of 3.2 volts. At room temperature, this battery exhibited the following polarization behavior which is shown below in Table I.

TABLE I

| Current milliamperes: | Energy volts |
|---|---|
| 0 | 3.2 |
| 0.26 | 2.5 |
| 0.52 | 2.2 |
| 1.2 | 1.8 |
| 2.5 | 1.2 |
| 3.6 | 0.8 |
| 5.1 | 0 |

EXAMPLE III

A battery was assembled generally in accordance with the above description and with the single FIGURE of the drawing wherein a metallic casing having a nickel portion and a niobium portion was provided. Each casing portion was in the form of a cup with a lip and a tube extending from the closed surface. A solid sodium ion-conductive electrolyte was provided in the form of a disc of sodium beta-alumina. A glass ring with approximately the inside and outside diameter of the cup lip was cut from General Electric Company 1013 glass tubing. The electrolyte disc, glass ring and lip of the anode portion were stacked together on a jig which was lowered into an inert atmosphere furnace at 1000° C. for about 1 minute. The resulting seal was tested and found to be helium leak-tight. A similar glass ring and the lip of the cathode portion were positioned in that respective order on the opposite side of the electrolyte disc which components were stacked together on a jig after which the structure was lowered into an inert atmosphere furnace at 1000° C. for about 1 minute. The second seal was found to be helium leak-tight.

The anode portion was then filled through its fill tube with molen sodium which solidified. The end of the fill tube was then sealed by welding. Solid iodine powder and iodine in a solution of methanol and sodium iodide was added through the other fill tube to the cathode portion. This fill tube was then sealed at its end by welding. The resulting device was a sealed primary sodium-iodine battery.

While other modifications of the invention and variations thereof which may be employed within the scope of the invention have not been described, the invention is intended to include such as may be embraced within the following claims.

What I claim as new and desire to secure by Letters Patent of the United States is:

1. A sealed primary sodium-iodine battery operable in a temperature range of —98° C. to 64° C. consisting of a casing, a solid sodium anode positioned in the casing, a solid sodium beta-alumina ion-conductive electrolyte adjacent the anode, and a cathode positioned adjacent the opposite side of the electrolyte, the cathode consisting of solid iodine and iodine contained in a solution of alcohol and sodium iodide.

2. In a sealed primary sodium-iodine battery as in claim 1, in which the alcohol is methanol.

3. In a sealed primary sodium-iodine battery as in claim 1, in which the casing has an anode portion and a cathode portion, the anode portion consisting of nickel, and the cathode portion consisting of a metal selected from the class consisting of niobium and tantalum.

4. In a sealed primary sodium-iodine battery as in claim 1, in which the casing has an anode portion and a cathode portion, the anode portion consisting of Kovar alloy, and the cathode portion consisting of a metal selected from the class consisting of niobium and tantalum.

References Cited

UNITED STATES PATENTS

| | | | |
|---|---|---|---|
| 3,554,806 | 1/1971 | Greenberg et al. | 136—6 |
| 3,437,524 | 4/1969 | Hamby | 136—83 R |
| 3,573,105 | 3/1971 | Weininger et al. | 136—86 A |
| 3,134,698 | 5/1964 | Neipert et al. | 136—83 R |
| 3,374,120 | 3/1968 | Lawson | 136—83 R |
| 2,905,740 | 9/1959 | Smyth et al. | 136—83 R |
| 3,476,602 | 11/1969 | Brown et al. | 136—83 R |
| 3,642,538 | 2/1972 | Zito, Jr. | 136—6 |
| 3,582,404 | 1/1971 | Blockburne et al. | 136—83 R |
| 3,438,813 | 4/1969 | Davis | 136—83 R |
| 3,607,405 | 9/1971 | Christopher | 136—20 |
| 3,404,036 | 10/1968 | Kumner et al. | 136—153 |
| 3,607,417 | 9/1971 | McRae | 136—146 |

ALLEN B. CURTIS, Primary Examiner

C. F. LEFEVOUR, Assistant Examiner

U.S. Cl. X.R.

136—153